United States Patent
Kang et al.

(10) Patent No.: US 11,973,583 B2
(45) Date of Patent: Apr. 30, 2024

(54) COMMUNICATION METHOD OF HETEROGENEOUS DISTRIBUTED WIRELESS NETWORK SYSTEM, AND HETEROGENEOUS DISTRIBUTED WIRELESS NETWORK SYSTEM

(71) Applicant: KOREA ADVANCED INSTITUTE OF SCIENCE AND TECHNOLOGY, Daejeon (KR)

(72) Inventors: Joonhyuk Kang, Daejeon (KR); Jinu Gong, Daejeon (KR); Wanjik Kim, Daejeon (KR); Dongwon Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 254 days.

(21) Appl. No.: 17/524,399

(22) Filed: Nov. 11, 2021

(65) Prior Publication Data

US 2022/0149975 A1    May 12, 2022

(30) Foreign Application Priority Data

Nov. 12, 2020 (KR) .................. 10-2020-0151177
Oct. 1, 2021 (KR) .................. 10-2021-0130998

(51) Int. Cl.
*H04K 1/00* (2006.01)
*H04B 17/336* (2015.01)
(Continued)

(52) U.S. Cl.
CPC ............ *H04K 1/00* (2013.01); *H04B 17/336* (2015.01); *H04W 12/03* (2021.01); *H04W 24/08* (2013.01)

(58) Field of Classification Search
CPC ....... H04K 1/00; H04B 17/336; H04W 12/03; H04W 24/08
See application file for complete search history.

(56) References Cited

U.S. PATENT DOCUMENTS 9,800,367 B1 * 10/2017 Dai .................. H04K 3/825
10,069,592 B1 * 9/2018 Krunz ................ H04K 3/43
(Continued)

FOREIGN PATENT DOCUMENTS

KR         101645204 B    8/2016
KR      1020170073329 A   6/2017
(Continued)

OTHER PUBLICATIONS

Ju, Ying, et al. "Artificial noise hopping: A practical secure transmission technique with experimental analysis for millimeter wave systems." IEEE Systems Journal 14.4 (2020): 5121-5132.*
(Continued)

*Primary Examiner* — Jimmy H Tran
(74) *Attorney, Agent, or Firm* — George R. McGuire (57) ABSTRACT

A communication method of a heterogeneous distributed wireless network system includes calculating a first transmission threshold in the heterogeneous distributed wireless network system including a plurality of distributed networks that share a same frequency band, determining whether data is transmitted by transmitter/receiver pairs included in the heterogeneous distributed wireless network system, based on the first transmission threshold, calculating a second transmission threshold locally for each of the distributed networks, based on whether data is transmitted by at least one transmitter belonging to the transmitter/receiver pairs, selectively determining whether data is transmitted for each of the distributed networks based on the second transmission threshold, and transmitting the data.

20 Claims, 5 Drawing Sheets

(51) Int. Cl.
   *H04W 12/03* (2021.01)
   *H04W 24/08* (2009.01)

(56) References Cited

U.S. PATENT DOCUMENTS

| | | | | |
|---|---|---|---|---|
| 10,439,755 | B1* | 10/2019 | Krunz | H04K 1/02 |
| 11,671,134 | B2* | 6/2023 | Latif | H04B 17/29 |
| | | | | 455/296 |
| 2009/0015478 | A1* | 1/2009 | Li | H04B 7/086 |
| | | | | 342/377 |
| 2009/0019150 | A1* | 1/2009 | Li | H04B 7/086 |
| | | | | 709/224 |
| 2012/0034874 | A1* | 2/2012 | Yiu | H04B 7/086 |
| | | | | 455/67.11 |
| 2012/0214403 | A1* | 8/2012 | Shany | H04K 3/825 |
| | | | | 455/1 |
| 2013/0273947 | A1* | 10/2013 | Baek | H04W 12/122 |
| | | | | 455/500 |
| 2013/0344913 | A1* | 12/2013 | Li | H04W 52/244 |
| | | | | 455/522 |
| 2014/0029516 | A1* | 1/2014 | Heo | H04W 24/02 |
| | | | | 370/328 |
| 2014/0086198 | A1* | 3/2014 | Andrews | H04W 72/541 |
| | | | | 370/330 |
| 2014/0315593 | A1* | 10/2014 | Vrzic | H04W 52/40 |
| | | | | 455/522 |
| 2015/0036516 | A1* | 2/2015 | Rusek | H04K 3/822 |
| | | | | 370/252 |
| 2015/0280888 | A1* | 10/2015 | Karsi | H04L 25/0228 |
| | | | | 370/329 |
| 2016/0241316 | A1* | 8/2016 | Fattouche | H04B 7/0452 |
| 2018/0020357 | A1* | 1/2018 | Zhang | H04W 16/10 |
| 2018/0062824 | A1* | 3/2018 | Noh | H04L 5/16 |
| 2018/0220313 | A1* | 8/2018 | Goldhamer | H04L 5/0053 |
| 2018/0278348 | A1* | 9/2018 | Chae | H04L 1/0026 |
| 2018/0287685 | A1* | 10/2018 | Lee | H04B 7/0632 |
| 2019/0028320 | A1* | 1/2019 | Xu | H04L 27/362 |
| 2019/0115949 | A1* | 4/2019 | Kim | H04B 1/7143 |
| 2019/0229833 | A1* | 7/2019 | Ha | H04W 52/267 |
| 2019/0296838 | A1* | 9/2019 | Hessler | H04L 1/203 |
| 2020/0021338 | A1* | 1/2020 | Perlman | H04B 7/0434 |
| 2020/0107216 | A1* | 4/2020 | Greel | H04W 28/0236 |
| 2021/0160713 | A1* | 5/2021 | Yang | H04L 1/206 |
| 2021/0203433 | A1* | 7/2021 | Arslan | H04L 9/3231 |
| 2022/0029670 | A1* | 1/2022 | Fakoorian | H04L 25/0224 |
| 2022/0095119 | A1* | 3/2022 | Doshi | H04W 16/14 |
| 2022/0116070 | A1* | 4/2022 | Majid | H04B 1/7097 |
| 2022/0116789 | A1* | 4/2022 | Bertizzolo | H04B 7/0617 |
| 2022/0149975 | A1* | 5/2022 | Kang | H04W 12/03 |
| 2022/0239351 | A1* | 7/2022 | Huang | H04L 5/0094 |
| 2022/0256334 | A1* | 8/2022 | Da Silva Gameiro | |
| | | | | H04L 25/0204 |
| 2022/0329344 | A1* | 10/2022 | Fellhauer | H04W 12/02 |
| 2022/0394463 | A1* | 12/2022 | Fellhauer | H04K 3/825 |
| 2023/0189315 | A1* | 6/2023 | Haustein | H04W 24/02 |
| | | | | 370/252 |
| 2023/0199708 | A1* | 6/2023 | Wu | H04W 4/40 |
| | | | | 370/329 |
| 2023/0276230 | A1* | 8/2023 | Lee | H04W 74/0833 |
| | | | | 455/411 |

FOREIGN PATENT DOCUMENTS

| | | |
|---|---|---|
| KR | 20190041748 A | 4/2019 |
| KR | 20190112935 A | 10/2019 |

OTHER PUBLICATIONS

Khandaker, Muhammad RA, et al. "Secure SWIPT by exploiting constructive interference and artificial noise." IEEE Transactions on Communications 67.2 (2018): 1326-1340.*

Xue, Qing, et al. "Performance analysis of interference and eavesdropping immunity in narrow beam mmWave networks." IEEE Access 6 (2018): 67611-67624.*

Ssettumba, Tonny, et al. "Physical layer security enhancement for Internet of Things in the presence of co-channel interference and multiple eavesdroppers." IEEE Internet of Things Journal 6.4 (2019): 6441-6452.*

Moualeu, Jules M., Walaa Hamouda, and Fambirai Takawira. "Intercept probability analysis of wireless networks in the presence of eavesdropping attack with co-channel interference." IEEE Access 6 (2018): 41490-41503.*

* cited by examiner

COMMUNICATION METHOD OF HETEROGENEOUS DISTRIBUTED WIRELESS NETWORK SYSTEM, AND HETEROGENEOUS DISTRIBUTED WIRELESS NETWORK SYSTEM

CROSS-REFERENCE TO RELATED APPLICATIONS

This application claims the benefit of Korean Patent Application No. 10-2020-0151177 filed on Nov. 12, 2020, and Korean Patent Application No. 10-2021-0130998 filed on Oct. 1, 2021, in the Korean Intellectual Property Office, the entire disclosures of which are incorporated herein by reference for all purposes.

This invention was made with support by Institute of Information & communications Technology Planning & Evaluation (IITP) grant funded by the Korea government (MSIT) (No. 2018-0-00831, A Study on Physical Layer Security for Heterogeneous Wireless Network).

This invention was made with support by the MSIT (Ministry of Science and ICT), Korea, under the ITRC (Information Technology Research Center) support program (IITP-2020-0-01787) supervised by the IITP (Institute of Information & Communications Technology Planning & Evaluation).

BACKGROUND

1. Field of the Invention

One or more example embodiments relate to a communication method of a heterogeneous distributed wireless network system for selectively transmitting data to increase a secrecy capacity, and relate to the heterogeneous distributed wireless network system.

2. Description of the Related Art

Since a wireless communication system is susceptible to malicious eavesdropping due to intrinsic characteristics of media, various security technologies may be used to compensate for vulnerability to eavesdropping. For example, in encryption technology of a network layer, information leakage is enabled through decryption technology. To solve such an issue, security technology of a physical layer may be used.

A distributed network may be a network including multiple pairs of transmitters and receivers. In a distributed network environment, a security of a physical layer may be enhanced using interference within a network.

SUMMARY

According to an example embodiment, a secrecy transmission rate of a physical layer may be enhanced by utilizing physical characteristics of a wireless channel including an interference channel of a pair of a transmitter and a receiver and an interference channel between heterogeneous distributed networks, in a heterogeneous distributed wireless network environment.

According to an example embodiment, a communication technology with a guaranteed security may be provided by enhancing a secrecy transmission rate through an exchange of a small amount of information in a heterogeneous distributed wireless network system.

According to an aspect, there is provided a communication method of a heterogeneous distributed wireless network system, the communication method including calculating a first transmission threshold in the heterogeneous distributed wireless network system including a plurality of distributed networks that share the same frequency band, determining whether data is transmitted by transmitter/receiver pairs included in the heterogeneous distributed wireless network system, based on the first transmission threshold, calculating a second transmission threshold locally for each of the distributed networks, based on whether data is transmitted by at least one transmitter belonging to the transmitter/receiver pairs, and selectively determining whether data is transmitted for each of the distributed networks based on the second transmission threshold, and transmitting the data.

The determining of whether the data is transmitted by the transmitter/receiver pairs may include determining a transmission index indicating whether data is transmitted by a first transmitter paired with a first receiver based on the first transmission threshold and a first signal-to-interference noise ratio (SINR) of the first receiver belonging to the transmitter/receiver pairs, and allowing the first receiver to feed back the transmission index to the first transmitter.

The determining of the transmission index may include calculating the first SINR of the first receiver, and determining the transmission index indicating whether the data is transmitted by the first transmitter paired with the first receiver, based on the first SINR.

The determining of the transmission index may include determining the transmission index based on a signal-to-noise ratio (SNR) corresponding to the first transmitter, a channel between the first transmitter and the first receiver forming a first pair, and a channel between a second transmitter and the first receiver in a distributed network to which the first pair belongs.

The communication method may further include allowing the first transmitter to transmit the data according to the transmission index, based on whether the first SINR of the first receiver forming a first pair with the first transmitter exceeds the first transmission threshold.

The calculating of the second transmission threshold may include calculating the second transmission threshold locally for each of the distributed networks, based on whether the at least one transmitter that transmits data based on the transmission index is present in the heterogeneous distributed wireless network system.

The calculating of the second transmission threshold may include, when the at least one transmitter is absent in the heterogeneous distributed wireless network system, calculating the second transmission threshold.

The calculating of the second transmission threshold may include calculating a secrecy capacity for a first pair that transmits the data among the transmitter/receiver pairs included in the heterogeneous distributed wireless network system, based on an SINR of the first pair and an SINR of a receiver belonging to one of pairs other than the first pair, and calculating the second transmission threshold based on the secrecy capacity.

The calculating of the second transmission threshold may include calculating a probability that a transmitter transmits data for each of the distributed networks in the heterogeneous distributed wireless network system, calculating a local transmission probability that the data is transmitted in a distributed network including a transmitter/receiver pair to which the transmitter belongs, based on the probability that the transmitter transmits data, and calculating the second transmission threshold based on the local transmission probability.

The calculating of the local transmission probability may include calculating the local transmission probability by approximating a path loss in the distributed network.

The selectively determining of whether the data is transmitted for each of the distributed networks may include selectively determining whether data is transmitted for each of the distributed networks, based on an SINR of a first pair to which at least one transmitter that transmits the data belongs, a second SINR that is based on SINRs of receivers belonging to pairs other than the first pair, and the second transmission threshold, and transmitting the data based on a result of the determining of whether the data is transmitted.

The calculating of the first transmission threshold may include calculating the first transmission threshold based on a path loss of the transmitter/receiver pairs included in the heterogeneous distributed wireless network system.

According to another aspect, there is provided a heterogeneous distributed wireless network system including a processor configured to calculate a first transmission threshold in the heterogeneous distributed wireless network system including a plurality of distributed networks that share the same frequency band, to determine whether data is transmitted by transmitter/receiver pairs included in the heterogeneous distributed wireless network system based on the first transmission threshold, to calculate a second transmission threshold locally for each of the distributed networks based on whether data is transmitted by at least one transmitter belonging to the transmitter/receiver pairs, and to selectively determine whether data is transmitted for each of the distributed networks based on the second transmission threshold, and a communication interface configured to transmit the data for each of the distributed networks based on a determination of whether the data is transmitted.

The processor may be configured to determine a transmission index indicating whether data is transmitted by a first transmitter paired with a first receiver among the transmitter/receiver pairs, based on the first transmission threshold and a first SINR of the first receiver, and configured to allow the first receiver to feed back the transmission index to the first transmitter.

The processor may be configured to calculate the first SINR of the first receiver, and to determine the transmission index indicating whether the data is transmitted by the first transmitter paired with the first receiver, based on the first SINR.

The processor may be configured to allow the first transmitter to transmit the data according to the transmission index, based on whether the first SINR exceeds the first transmission threshold.

The processor may be configured to calculate the second transmission threshold locally for each of the distributed networks, based on whether the at least one transmitter that transmits data based on the transmission index is present in the heterogeneous distributed wireless network system.

The processor may be configured to calculate a secrecy capacity for a first pair that transmits the data among the transmitter/receiver pairs included in the heterogeneous distributed wireless network system, based on an SINR of the first pair and an SINR of a receiver belonging to one of pairs other than the first pair, and to calculate the second transmission threshold based on the secrecy capacity.

The processor may be configured to calculate a probability that a transmitter transmits data for each of the distributed networks in the heterogeneous distributed wireless network system, to calculate a local transmission probability that the data is transmitted in a distributed network including a transmitter/receiver pair to which the transmitter belongs, based on the probability that the transmitter transmits data, and to calculate the second transmission threshold based on the local transmission probability.

Additional aspects of example embodiments will be set forth in part in the description which follows and, in part, will be apparent from the description, or may be learned by practice of the disclosure.

According to example embodiments, it is possible to enhance a secrecy transmission rate of a physical layer by utilizing physical characteristics of a wireless channel including an interference channel of a pair of a transmitter and a receiver and an interference channel between heterogeneous distributed networks, in a heterogeneous distributed wireless network environment.

According to example embodiments, a communication technology with guaranteed security may be provided by enhancing a secrecy transmission rate through an exchange of a small amount of information in a heterogeneous distributed wireless network system.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 1:
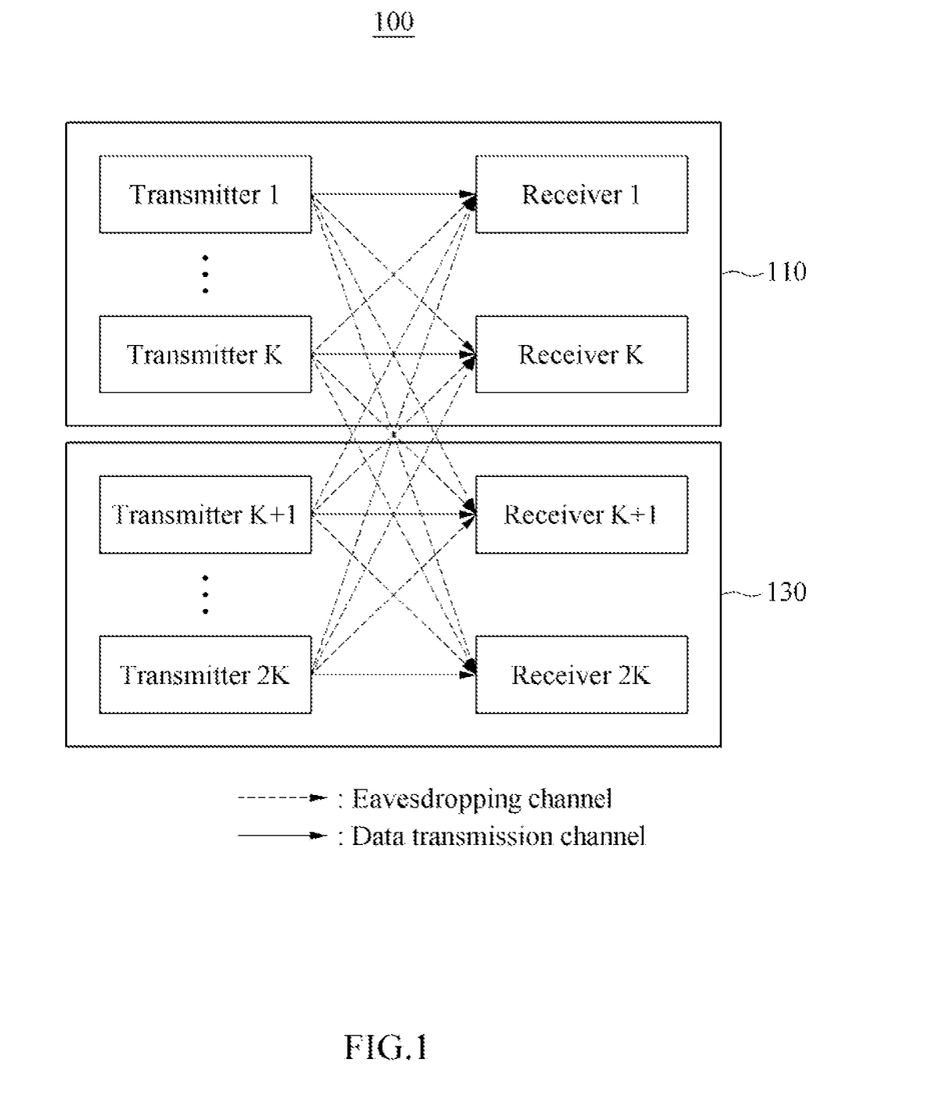
FIG. 1 is a diagram illustrating a structure of a heterogeneous distributed wireless network according to an example embodiment.

FIG. 1 is a diagram illustrating a structure of a heterogeneous distributed wireless network according to an example embodiment. Referring to FIG. 1, a structure of a heterogeneous distributed wireless network 100 including a distributed network 1 110 and a distributed network 2 130 is illustrated.

A heterogeneous distributed wireless network may refer to a network in which a plurality of distributed networks (for example, the distributed network 1 110 and the distributed network 2 130) share the same frequency band. In a heterogeneous distributed wireless network system (hereinafter, referred to as a "network system") according to an example embodiment, "K" transmitters belonging to each of the distributed network 1 110 and the distributed network 2 130 may include a single antenna, and may transmit data to "K" receivers paired with the "K" transmitters through a data transmission channel based on a selective transmission technology according to an example embodiment.

For example, each of the distributed network 1 110 and the distributed network 2 130 may include "K" transmitters and "K" receivers. The distributed network 1 110 and the distributed network 2 130 may be heterogeneous networks or homogeneous networks. For example, the distributed network 1 110 may correspond to a distributed network in which a wireless communication service is provided through a wireless communication network of a communication company A, and the distributed network 2 130 may correspond to a distributed network in which a wireless communication service is provided through a wireless communication network of a communication company B.

A set of "2K" pairs of transmitters and receivers included in a heterogeneous distributed network system may be expressed as $\mathcal{K} = \cup_{l \in \mathcal{L}} \mathcal{G}^{(l)}$, in which $\mathcal{G}^{(l)}$ may indicate an l-th distributed network among "$\mathcal{L}$" distributed networks. For example, if a transmitter i belongs to the l-th distributed network, a corresponding distributed network may be expressed as $\mathcal{G}^{(l_i)}$, and the transmitter i may be expressed as $i \in \mathcal{G}^{(l_i)}$.

In an example, it may be assumed that reception of signals by all receivers from all transmitters included in the network system is possible. In this example, receivers other than a receiver i paired with the transmitter i may be regarded as potential eavesdroppers. In addition, a channel between a transmitter and a receiver that do not form a pair may correspond to an eavesdropping channel.

For example, a signal $y_i$ received by one receiver I included in the network system may be defined as shown in Equation 1 below.

$$y_i = \alpha_i \sqrt{P} h_{ii} s_i + \sum_{j \in \mathcal{G}_i^{(l_i)}} \alpha_j \sqrt{P} h_{ji} s_j + \sum_{l \in \mathcal{L} \setminus \{l_i\}} \sum_{j \in \mathcal{G}^{(l)}} \alpha_j \sqrt{P} h_{ji} s_j + z_i \quad [\text{Equation 1}]$$

In Equation 1, $\alpha_i$ may correspond to a transmission index indicating whether data is transmitted by the transmitter i paired with the receiver i. In addition, the transmission index $\alpha_j$ may correspond to a transmission index indicating whether data is transmitted by a transmitter j paired with the receiver i. Transmission indices $\alpha_i$ and $\alpha_j$ may have, for example, a value of "0" or "1". The transmission indices $\alpha_i$ and $\alpha_j$ may be determined according to a selective transmission method according to an example embodiment.

P may correspond to transmission power. $s_i$ may correspond to transmission data of the transmitter i, and $s_j$ may correspond to transmission data of the transmitter j.

$h_{ii}$ may correspond to a channel between the transmitter i and the receiver i, and $h_{ji}$ may correspond to a channel between the transmitter j and the receiver i. The channel $h_{ji}$ may correspond to a slow fading channel. Slow fading may be a phenomenon in which a signal is attenuated when a line of sight (LOS) is blocked by a large building or a large-scale structure while the signal is propagated through a wireless space.

The channel $h_{ji}$ may follow a complex Gaussian distribution, for example, $h_{ji} \sim \mathcal{CN}(0, \lambda_{ji}^{-1})$. Here, may correspond to, for example, a path loss in a distributed network to which a pair of the transmitter j and the receiver i belongs.

A small path loss may occur in the same distributed network, and a large path loss may occur in a heterogeneous distributed network. As the path loss decreases, a degree of reduction of a transmitted signal may decrease.

In the network system, it may be assumed that pairs of transmitters and receivers have information on path losses corresponding to all paths.

Hereinafter, for convenience of description, a pair of the transmitter and the receiver may be simply referred to as a "transmitter/receiver pair". For example, a pair of the transmitter i and the receiver i may be simply referred to as a "transmitter/receiver pair i", and a pair of the transmitter i and a receiver j may be simply referred to as a "transmitter/receiver pair ij".

$z_i$ may correspond to additive white Gaussian noise of the receiver i. $z_i \sim \mathcal{CN}(0, N_0)$ may indicate complex Gaussian white noise of the receiver i.

$\mathcal{G}_i^{(l_i)}$ may correspond to a set of transmitting and receivers other than the transmitter/receiver pair i in the l-th distributed network to which the pair of the transmitter i and the receiver i belongs.

In Equation 1, $\alpha_i\sqrt{P}h_{ii}s_i$, which is a first term, may correspond to a signal of the transmitter/receiver pair i, and $$\sum_{j\in\mathcal{G}_i^{(l_i)}}\alpha_j\sqrt{P}h_{ji}s_j,$$

which is a second term may correspond to signals of pairs of transmitters and receivers other than the transmitter/receiver pair i in the distributed network (for example, the distributed network 1 110) to which the transmitter/receiver pair i belongs. In addition, $$\sum_{l\in\mathcal{L}\setminus\{l_i\}}\sum_{j\in\mathcal{G}^{(l)}}\alpha_j\sqrt{P}h_{ji}s_j,$$

which is a third term, may correspond to signals of pairs of transmitters and receivers included in another distributed network (for example, the distributed network 2 130) to which the transmitter/receiver pair i does not belong.

In an example embodiment, it may be assumed that each of the receivers included in the network system calculates a signal-to-interference noise ratio (SINR) and feeds back the SINR to a transmitter paired with a corresponding receiver.

According to an example embodiment, each of the receivers in transmitter/receiver pairs may calculate an SINR, and may determine a transmission index $\alpha_i$ indicating whether data is transmitted by the transmitter i forming the same pair, for example, based on Equation 2 shown below.

$$\alpha_i = \begin{cases} 1, & \text{if } \dfrac{|h_{ii}|^2}{\sum_{j\in\mathcal{K}_i}|h_{ji}|^2+\dfrac{1}{\rho}} > \xi_i \\ 0, & \text{otherwise} \end{cases} \quad \text{[Equation 2]}$$

In Equation 2, $\rho=P/N_0$ may be obtained by dividing transmission power P of the transmitter i by $N_0$, and may correspond to a signal-to-noise ratio (SNR). $N_0$ may correspond to power of additive white Gaussian noise.

The transmitter i may transmit data if the transmission index $\alpha_i$ is "1", and may not transmit data if the transmission index $\alpha_i$ is "0". The receiver i may feed back the transmission index $\alpha_i$ to the transmitter i paired with the receiver i. For example, when the SINR of the transmitter/receiver pair i exceeds a specific transmission threshold $\xi_i$, the network system may allow data to be transmitted.

In an example embodiment, a transmission probability may be enhanced by obtaining an appropriate transmission threshold $\xi_i$ according to requirements of the network system and selectively performing transmission.

Based on Equation 2, the network system may calculate a probability $\delta_i(\xi_i)$ that the transmitter i transmits data through Equation 3 shown below.

$$\delta_i(\xi_i) = Pr\left\{\dfrac{|h_{ii}|^2}{\sum_{j\in\mathcal{K}_i}|h_{ji}|^2+\dfrac{1}{\rho}} > \xi_i\right\} \quad \text{[Equation 3]}$$

-continued
$$= \sum_{j\in\bar{\mathcal{K}}_i}\prod_{k\in\bar{\mathcal{K}}_{ij}}\left(\dfrac{\lambda_{ki}}{\lambda_{ki}-\lambda_{ji}}\right)\dfrac{\lambda_{ji}}{\lambda_{ii}\xi_i+\lambda_{ji}}e^{-\dfrac{\lambda_{ii}}{\rho}\xi_i}.$$

In Equation 3, Pr may correspond to an abbreviation of a probability. $\bar{\mathcal{K}}_i$ may correspond to a set of transmitters and receivers other than the transmitter/receiver pair i in the entire network of the network system. Also, $\bar{\mathcal{K}}_{ij}$ may correspond to a set of transmitters and receivers other than the pair of the transmitter i and the receiver j in the entire network. Equation 3 may indicate that the probability $\delta_i$ that the transmitter i transmits data is determined by each channel and the transmission threshold $\xi_i$.

For example, a set of transmitter/receiver pairs that transmit data among all pairs of transmitters and receivers included in the network system may be defined as $\mathcal{N}$, and a set of transmitter/receiver pairs that do not transmit data may be defined as $\mathcal{M}$. In this example, if a set of transmission thresholds to determine whether data is transmitted is defined as $\xi \triangleq \{\xi_1, \ldots, \xi_i, \ldots, \xi_{2k}\}$, an SINR $\gamma_{\mathcal{N},i}$ of a transmitter/receiver pair transmitting data may be defined as shown in Equation 4.

$$\gamma_{\mathcal{N},i} = \dfrac{|h_{ii}|^2}{\sum_{j\in\bar{\mathcal{N}}_i}|h_{ji}|^2+\dfrac{1}{\rho}} \quad \text{[Equation 4]}$$

As described above, receivers other than a receiver forming a transmitter/receiver pair may be regarded as eavesdroppers. Here, an eavesdropper for data transmitted by the transmitter i, that is, an SINR $\gamma_{\mathcal{N},\tilde{i}}$ of a receiver $\tilde{i}$ may be defined as, for example, shown in Equation 5 below.

$$\gamma_{\mathcal{N},\tilde{i}} = \dfrac{|h_{\tilde{i}i}|^2}{\sum_{j\in\bar{\mathcal{N}}_i}|h_{j\tilde{i}}|^2+\dfrac{1}{\rho}} \quad \text{[Equation 5]}$$

Here, the receiver $\tilde{i}$ may correspond to another receiver belonging to a specific transmitter/receiver pair, that is, a potential eavesdropper, rather than the receiver i.

The network system may calculate an ergodic secrecy capacity $R_{\mathcal{N},i}(\xi_i)$ for the transmitter/receiver pair i using Equations 4 and 5, as shown in Equation 6 below.

$$R_{\mathcal{N},i}(\xi_i)=[\mathcal{N}\{\log_2(1+\gamma_{\mathcal{N},i})\}-\mathcal{N}\{\log_2(1+\gamma_{\mathcal{N},i_{max}})\}]^+ \quad \text{[Equation 6]}$$

In Equation 6, $\gamma_{\mathcal{N},\tilde{i}_{max}}$ may be $\max_{\tilde{i}\in\bar{\mathcal{K}}_i}\gamma_{\mathcal{N},\tilde{i}}$.

In an example embodiment, the secrecy capacity may be defined as a maximum transmission rate that enables a transmitter and a receiver to perform wireless communication without information leakage by an eavesdropping device. The secrecy capacity may correspond to a value indicating a degree of a physical layer security. For example, the secrecy capacity may be defined as a difference between a reception capacity of a receiver for data transmitted by a transmitter and a reception capacity of an eavesdropping device, using an equation. Accordingly, a beamforming design technology to increase the reception capacity of the receiver and an artificial noise technology to decrease the reception capacity of the eavesdropping device may be used for a security of a physical layer.

As a result, the ergodic secrecy capacity $R\mathcal{N},_i(\xi_i)$ or the transmitter/receiver pair i may be calculated according to Equation 6. In addition, in a selective transmission technology based on an SINR, the total secrecy capacity $R_S(\xi)$ of the entire network according to a transmission threshold $\xi$ may be calculated as shown in Equation 7 below.

$$R_S(\xi) = \frac{1}{K} \sum_{\mathcal{N} \subseteq \mathcal{K}, \mathcal{N} \neq \emptyset} \sum_{i \in \mathcal{N}} \prod_{i' \in \mathcal{N}} (\delta_{i'}(\xi_{i'})) \prod_{i'' \in \mathcal{M}} (1 - \delta_{i''}(\xi_{i''})) R_{\mathcal{N},i}(\xi) \quad \text{[Equation 7]}$$

In summary, since the set $\mathcal{N}$ of the transmitter/receiver pairs that transmit data and the ergodic secrecy capacity $R\mathcal{N},_i(\xi_i)$ are calculated based on a set $\xi$ of transmission thresholds, a secrecy transmission rate achievable by the heterogeneous distributed wireless network system according to an example embodiment may be determined by the set $\xi$.

For example, in an existing distributed network, when whether data is transmitted is determined based on a determined transmission threshold $\xi_i$ by a security transmission method, all transmitters may not perform transmission, so that the secrecy capacity may become zero, which may cause a damage to an ergodic secrecy capacity. In this example, in the existing distributed network, it is assumed that transmitter/receiver pairs may exchange information on whether data is transmitted with each other, when all transmitters do not perform the transmission, a transmitter having a largest SINR may be allowed to perform a transmission, thereby increasing the secrecy capacity. In other words, for a case in which all the transmitters do not transmit data, a transmitter for data transmission may be determined based on an SINR value. To maximize the secrecy transmission rate, transmitters and receivers may exchange SINR values, a transmitter/receiver pair having a largest SINR may be selected from the transmitters and the receivers, and data may be transmitted, to calculate the secrecy transmission rate.

On the contrary, in the heterogeneous distributed wireless network system according to an example embodiment, the secrecy capacity may be enhanced using a characteristic of a large path loss between heterogeneous distributed networks.

In an example embodiment, whether all the transmitter/receiver pairs perform transmission may be determined using the transmission threshold $\xi_i$ calculated in the entire heterogeneous distributed wireless network system. If it is determined that no transmission is performed in any distributed network, the network system may newly define Equation 7 using a characteristic of a large path loss between distributed networks.

The heterogeneous distributed wireless network 100 may have a large path loss between the distributed network 1 110 and the distributed network 2 130 due to, for example, a physical distance or a wall. In the distributed network 1 110 and the distributed network 2 130 with a large path loss, if data is not transmitted to different distributed networks, a loss in the secrecy transmission rate may increase. The network system according to an example embodiment may determine whether data is transmitted by newly calculating the transmission threshold $\xi_i$ that determines a transmission method as a local transmission threshold $\xi_i^{(l_i)}$ by the newly defined Equation 7.

For example, a method of calculating the local transmission threshold $\xi_i^{(l_s)}$ corresponding to each distributed network included in the network system according to an example embodiment is described below.

First, Equation 3 representing the probability $\delta_i(\xi_i)$ that the transmitter i transmits data may be arranged as shown in Equation 8 below.

$$\delta_i(\xi_i) = Pr\left\{ \frac{|h_{ii}|^2}{\sum_{j \in \mathcal{K}_i} |h_{ji}|^2 + \frac{1}{\rho}} > \xi_i \right\} = \quad \text{[Equation 8]}$$

$$\sum_{j \in \mathcal{K}_i} \prod_{k \in \mathcal{K}_{ij}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i} =$$

$$\sum_{j \in \mathcal{G}_i^{(l_i)}} \prod_{k \in \mathcal{K}_{ij}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i} +$$

$$\sum_{l \in \mathcal{L} \setminus \{l_i\}} \sum_{j \in \mathcal{G}^{(l)}} \prod_{k \in \mathcal{K}_{ij}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i} =$$

$$\sum_{j \in \mathcal{G}_i^{(l_i)}} \prod_{k \in \mathcal{G}_i^{(l_i)}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i}$$

$$\prod_{k \in \mathcal{G}_{ij}^{(l_i) \setminus \{l_i\}}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i} +$$

$$\sum_{l \in \mathcal{L} \setminus \{l_i\}} \sum_{j \in \mathcal{G}^{(l)}} \prod_{k \in \mathcal{G}_{ij}^{(l_i)}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i}$$

$$\prod_{k \in \mathcal{G}_{ij}^{(l_i) \setminus \{l_i\}}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i} = \sum_{j \in \mathcal{G}_i^{(l_i)}} \prod_{k \in \mathcal{G}_{ij}^{(l_i)}} \left(\frac{\lambda_{ki}}{\lambda_{ki} - \lambda_{ji}}\right)$$

$$\frac{\lambda_{ji}}{\lambda_{ii}\xi_i + \lambda_{ji}} e^{-\frac{\lambda_{ii}}{\rho}\xi_i} \prod_{k \in \mathcal{G}_{ij}^{(l_i) \setminus \{l_i\}}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i} +$$

$$\sum_{l \in \mathcal{L} \setminus \{l_i\}} \sum_{j \in \mathcal{G}^{(l)}} \prod_{k \in \mathcal{G}_{ij}^{(l_i)}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i}$$

$$\prod_{k \in \mathcal{G}_{ij}^{(l_i) \setminus \{l_i\}}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i}$$

In Equation 8, the probability that the transmitter i transmits data may be calculated separately for each of a case i) in which a pair of the transmitter i and a receiver k is in the same distributed network as that of the pair of the transmitter i and the receiver i; a case ii) in which a pair of the transmitter j and the receiver j is in the same distributed network as that of the pair of the transmitter i and the receiver i and in a distributed network different from a distributed network to which a pair of a transmitter k and the receiver k belongs; and a case iii) in which a pair of the transmitter j and the receiver k is in a distributed network different from a distributed network to which the pair of the transmitter i and the receiver i belongs.

Here, if it is assumed that a path loss between different distributed networks increases based on a characteristic of a large path loss between the distributed network 1 110 and the distributed network 2 130, Equation 8 may be approximated as shown in Equation 9 below.

$$\delta_i(\xi_i) \approx \sum_{j \in \mathcal{G}_i^{(l_i)}} \prod_{k \in \mathcal{G}_{ij}^{(l_i)}} \left(\frac{\lambda_{ki}}{\lambda_{ki} - \lambda_{ji}}\right) \quad \text{[Equation 9]}$$

$$\frac{\lambda_{ji}}{\lambda_{ii}\xi_i + \lambda_{ji}} e^{-\frac{\lambda_{ii}}{\rho}\xi_i} \prod_{k \in \overline{\mathcal{G}}_{ij}^{(\mathcal{L} \setminus \{l_i\})}} \frac{\lambda_{ji}}{\lambda_{ii}\xi_i + \lambda_{ji}} e^{-\frac{\lambda_{ii}}{\rho}\xi_i} +$$

$$\sum_{l \in \mathcal{L} \setminus \{l_i\}} \sum_{j \in \mathcal{G}^{(l)}} \prod_{k \in \overline{\mathcal{G}}_{ij}^{(l_i)}} \left(\frac{\lambda_{ki}}{\lambda_{ki} - \lambda_{ji}}\right) e^{-\frac{\lambda_{ii}}{\rho}\xi_i} \prod_{k \in \overline{\mathcal{G}}_{ij}^{(\mathcal{L} \setminus \{l_i\})}} \left(\frac{\lambda_{ki}}{\lambda_{ki} - \lambda_{ji}}\right) e^{-\frac{\lambda_{ii}}{\rho}\xi_i}$$

For example, transmitters and receivers belonging to the same distributed network may have a great influence on each other. Accordingly, in an example embodiment, a local transmission probability $\delta_i^{(l_i)}(\xi_i^{(l_i)})$ of the distributed network, to which the pair of the transmitter i and the receiver i belongs, to be newly obtained may be summarized as shown in Equation 10 below.

$$\delta_i^{(l_i)}(\xi_i^{(l_i)}) = \sum_{j \in \overline{\mathcal{G}}_i^{(l_i)}} \prod_{k \in \overline{\mathcal{G}}_{ij}^{(l_i)}} \left(\frac{\lambda_{ki}}{\lambda_{ki} - \lambda_{ji}}\right) \frac{\lambda_{ji}}{\lambda_{ii}\xi_i + \lambda_{ji}} e^{-\frac{\lambda_{ii}}{\rho}\xi_i^{(l_i)}} \quad \text{[Equation 10]}$$

In an example embodiment, an optimal local transmission probability may be calculated by, for example, a convex optimization algorithm that maximizes Equation 11 while having a local transmission probability as an optimization variable. The convex optimization algorithm may include, for example, an interior point method.

A local transmission probability $\xi_i^{(l_i)}$ may be obtained through Equation 10 and the local transmission threshold $\delta_i^{(l_i)}(\xi_i^{(l_i)})$ obtained through the convex optimization algorithm.

The network system according to an example embodiment may determine whether to transmit data based on the local transmission threshold $\xi_i^{(l_i)}$.

For example, a secrecy capacity $R_s(\xi^{(l_i)})$ enhanced based on the transmission method according to the local transmission threshold $\xi_i^{(l_i)}$ may be defined as shown in Equation 11 below.

$$R_S(\xi^{(l_i)}) = \frac{1}{|\mathcal{G}^{(l_i)}|} \sum_{N \subseteq \mathcal{G}^{(l_i)}, N \neq \theta} \sum_{i \in N} \prod_{i' \in N} (\delta_{i'}^{(l_i)}(\xi_{i'}^{(l_i)})) \prod_{i'' \in M} (1 - \delta_{i''}^{(l_i)}(\xi_{i''}^{(l_i)})) R_{N,i}(\xi^{(l_i)}) \quad \text{[Equation 11]}$$

Figure 2:
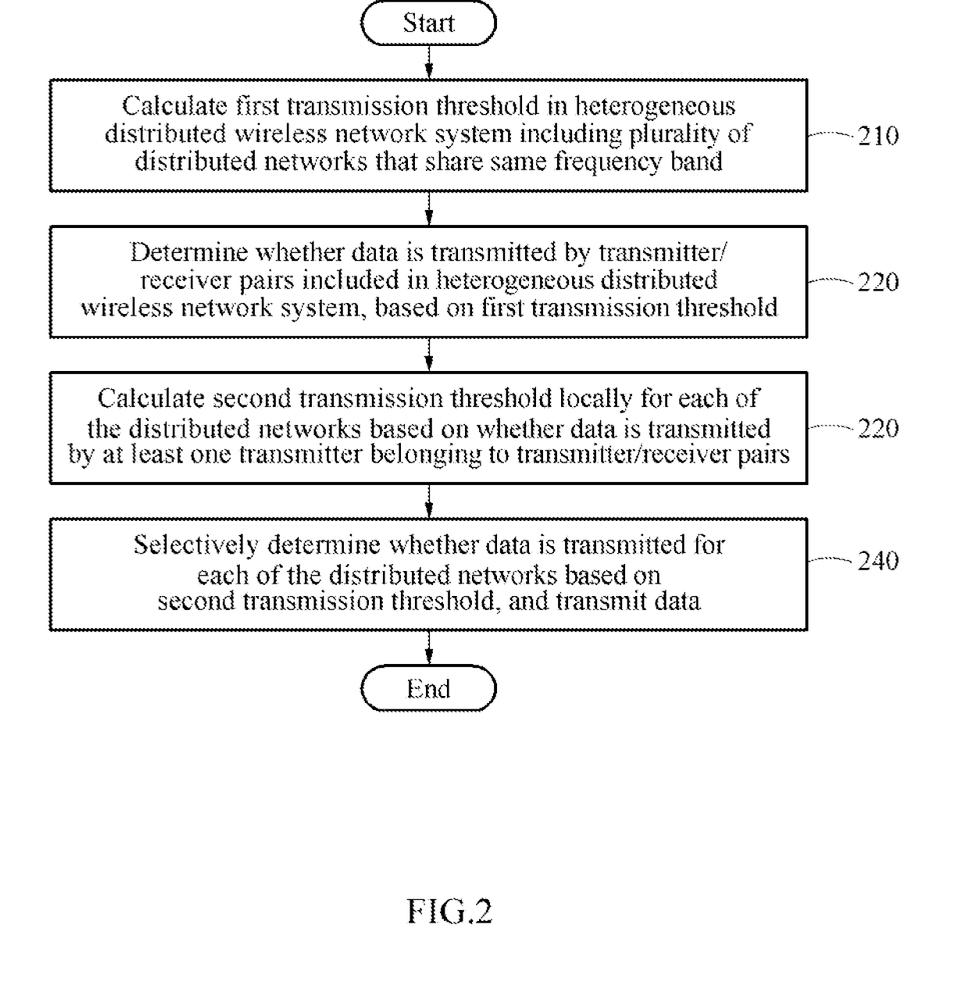
FIG. 2 is a flowchart illustrating an example of a communication method according to an example embodiment.

FIG. 2 is a flowchart illustrating an example of a communication method according to an example embodiment. In the following example embodiments, operations may be performed sequentially, but not necessarily performed sequentially. For example, the operations may be performed in different orders, and at least two of the operations may be performed in parallel.

Referring to FIG. 2, a process in which a network system according to an example embodiment selectively transmits data through operations 210 through 240 is illustrated.

In operation 210, the network system may calculate a first transmission threshold $\xi_i$ in a heterogeneous distributed wireless network system including a plurality of distributed networks that share the same frequency band. The network system may calculate the first transmission threshold based on a path loss $\lambda$ of transmitter/receiver pairs included in the heterogeneous distributed wireless network system. For example, the network system may calculate the first transmission threshold in the same manner as a local threshold calculation scheme. In an example embodiment, an optimal transmission probability may be calculated by, for example, a convex optimization algorithm that maximizes Equation 7. The network system may obtain the first transmission threshold based on Equation 3 and a first transmission probability obtained through the convex optimization algorithm. For example, a path loss $\lambda_{ji}$ may correspond to a path loss in a distributed network to which a pair of the transmitter j and the receiver i belongs. For example, the path loss $\lambda_{ji}$ may be analyzed from a reception signal $y_i$ defined through Equation 1 described above.

In operation 220, the network system may determine whether data is transmitted by the transmitter/receiver pairs included in the heterogeneous distributed wireless network system, based on the first transmission $\xi_i$ threshold calculated in operation 210. The network system may calculate a first SINR of a first receiver and may determine a transmission index $\alpha_i$ indicating whether data is transmitted by a first transmitter paired with the first receiver, based on the first SINR. For example, the network system may determine the transmission index $\alpha_i$ as in Equation 2 described above, based on an SNR corresponding to the first transmitter, a channel (e.g., $h_{ii}$) between the first transmitter (e.g., the transmitter i) and the first receiver (e.g., the receiver i) forming a first pair, and a channel (e.g., $h_{ji}$) between a second transmitter (e.g., the transmitter j) and the first receiver (e.g., the receiver i) in a distributed network to which the first pair belongs. $\alpha_i$ may correspond to, for example, a transmission index indicating whether data is transmitted by the transmitter i paired with the receiver i.

The network system may allow the first receiver to feed back the determined transmission index to the first transmitter.

The network system may allow the first transmitter to transmit data according to the transmission index, based on whether a first SINR of the first pair of the first transmitter and the first receiver exceeds the first transmission threshold. For example, the transmitter i may transmit data if the transmission index $\alpha_i$ is "1", and may not transmit data if the transmission index $\alpha_i$ is "0". For example, when the first SINR of the first pair exceeds the first transmission threshold $\xi_i$, the network system may allow the first transmitter to transmit data according to) the transmission index. In this example, a probability $\delta_i(\xi_i)$ that the first transmitter transmits data may be obtained through Equation 3 described above.

In operation 230, the network system may calculate a second transmission threshold $\xi_i^{(l_i)}$ locally for each of the distributed networks based on whether data is transmitted by at least one transmitter belonging to the transmitter/receiver pairs. The network system may calculate the second transmission threshold $\xi_i^{(l_i)}$ locally for each of the distributed networks, based on whether at least one transmitter that transmits data according to the transmission index $\alpha_i$ is present in the heterogeneous distributed wireless network system. For example, when a transmitter that transmits data according to the transmission index is absent in the heterogeneous distributed wireless network system, the network system may calculate the second transmission threshold.

According to an example embodiment, when there is no transmitter that transmits data according to the transmission index $\alpha_i$ calculated as described above, the network system may calculate a local second transmission threshold by reducing the first transmission threshold to increase a transmission probability.

For example, the network system may calculate a secrecy capacity $R\mathcal{N}_{,i}(\xi_i)$ for the first pair as in Equation 6 described above, based on an SINR $\gamma\mathcal{N}_{,i}$ of the first pair (e.g., the transmitter/receiver pair i) belonging to a set $\mathcal{N}$ of pairs for transmitting data among all the transmitter/receiver pairs included in the heterogeneous distributed wireless network system, and based on an SINR $\gamma\mathcal{N}_{,\bar{j}}$ of a receiver belonging to one of pairs other than the first pair. In this example, the SINR $\gamma\mathcal{N}_{,i}$ of the first pair for transmitting data may be obtained through Equation 4 described above, and the SINR $\gamma\mathcal{N}_{,\bar{j}}$ of the receiver (e.g., a receiver ī as an eavesdropper) belonging to one of the pairs other than the first pair may be obtained through Equation 5 described above.

The network system may calculate the secrecy capacity for the transmitter/receiver pair i as in Equation 6 described above, based on the SINRs $\gamma\mathcal{N}_{,i}$ and $\gamma_{N,\bar{j}}$. The network system may calculate a second transmission threshold for the secrecy capacity $R\mathcal{N}_{,i}(\xi_i)$ The network system may calculate a second transmission threshold that maximizes a secrecy capacity.

For example, the network system may calculate a probability $\delta_i(\xi_i)$ that the transmitter i transmits data for each of the distributed networks in the heterogeneous distributed wireless network system, as in Equation 8 described above.

The network system may calculate a local transmission probability $\delta_i^{(l_i)}(\xi_i^{(l_i)})$ of data being transmitted in a distributed network including a transmitter/receiver pair to which a transmitter belongs, based on a probability $\delta_i(\xi_i)$ that the transmitter transmits data. For example, the network system may the local transmission probability $\delta_i^{(l_i)}(\xi_i^{(l_i)})$ by approximating a path loss between pairs in different distributed networks in Equation 8 as in Equation 9, based on a characteristic of a large path loss in different distributed networks. In this example, since transmitters and receivers belonging to the same distributed network have a great influence on each other, the network system may obtain the local transmission probability $\delta_i^{(l_i)}(\xi_i^{(l_i)})$ of a distributed network to which the pair of the transmitter i and the receiver i belongs, as in Equation 10 described above. The network system may calculate the second transmission threshold $\xi_i^{(l_i)}$ based on the local transmission probability $\delta_i^{(l_i)}(\xi_i^{(l_i)})$. The network system may calculate the second transmission threshold $\xi_i^{(l_i)}$) to maximize the local transmission probability $\delta_i^{(l_i)}(\xi_i^{(l_i)})$.

In operation 240, the network system may selectively determine whether data is transmitted for each of the distributed networks based on the second transmission threshold $\xi_i^{(l_i)}$) calculated in operation 230, and may transmit data. For example, the network system may selectively determine whether data is transmitted for each of the distributed networks, based on the SINR of the first pair to which at least one transmitter that transmits data belongs, a second SINR that is based on SINRs of receivers belonging to pairs other than the first pair, and the second transmission threshold, and may transmit data according to a determination result.

According to an example embodiment, a transmitter/receiver pair failing to transmit data by the first transmission threshold may be enabled to transmit data using a new second transmission threshold, thereby enhancing a transmission efficiency. In addition, a transmitter/receiver pair with a maintained security may be additionally formed, and thus a security probability may be enhanced.

Figure 3:
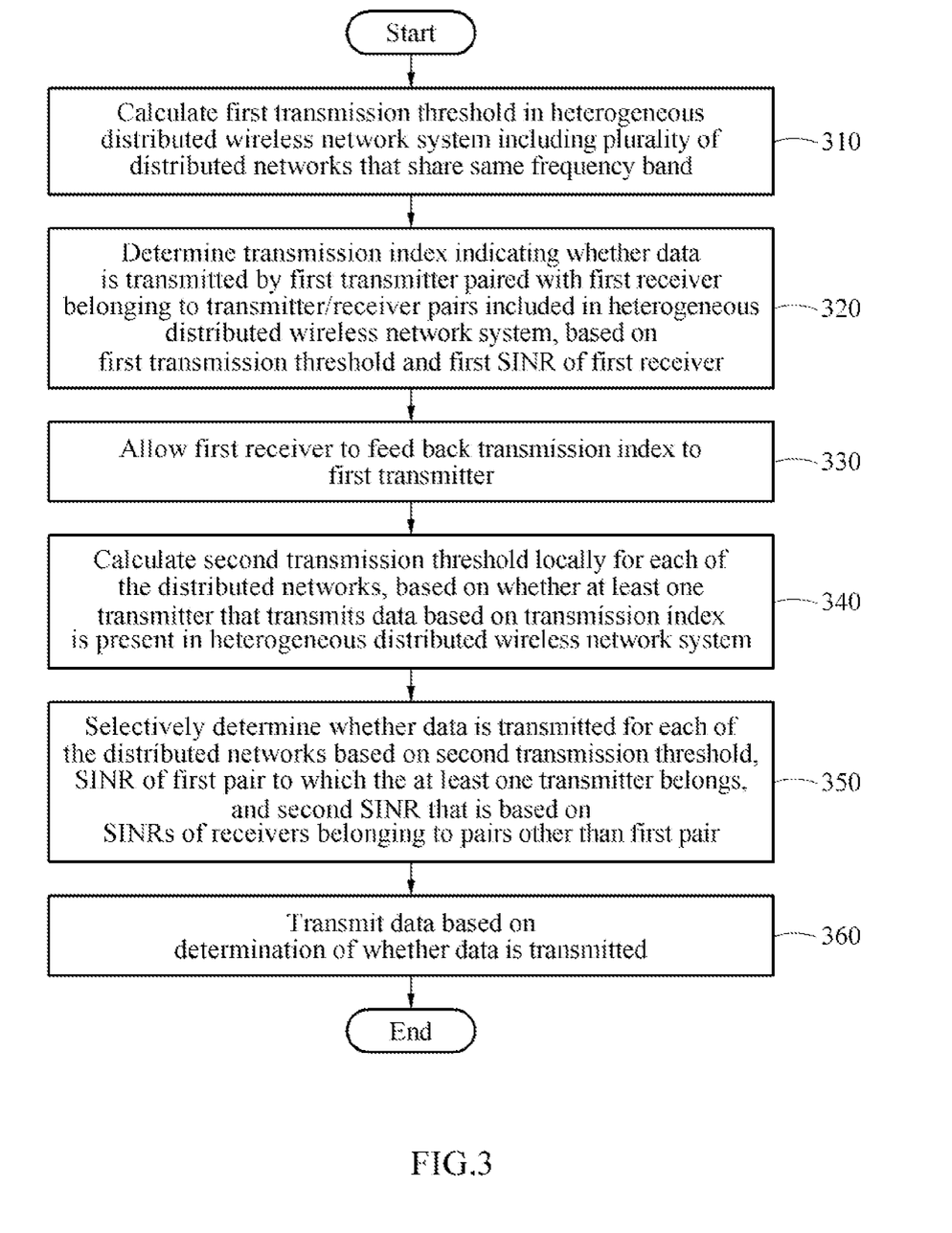
FIG. 3 is a flowchart illustrating another example of a communication method according to an example embodiment.

FIG. 3 is a flowchart illustrating another example of a communication method according to an example embodiment. In the following example embodiments, operations may be performed sequentially, but not necessarily performed sequentially. For example, the operations may be performed in different orders, and at least two of the operations may be performed in parallel.

Referring to FIG. 3, a process in which a network system according to an example embodiment selectively transmits data through operations 310 through 360 is illustrated.

In operation 310, the network system may calculate a first transmission threshold in a heterogeneous distributed wireless network system including a plurality of distributed networks that share the same frequency band. The network system may calculate the first transmission threshold based on a path loss of transmitter/receiver pairs included in the heterogeneous distributed wireless network system.

In operation 320, the network system may determine a transmission index indicating whether data is transmitted by a first transmitter paired with a first receiver, based on the first transmission threshold and a first SINR of the first receiver. The first receiver may belong to the transmitter/receiver pairs included in the heterogeneous distributed wireless network system. The network system may determine transmission indices indicating whether data is transmitted by transmitters paired with receivers, based on the first SNR. For example, the network system may determine the transmission index a $\alpha_i$ as in Equation 2 described above, based on an SNR corresponding to the first transmitter, a channel between the first transmitter and the first receiver forming the first pair, and a channel between a second transmitter and the first receiver in a distributed network to which the first pair belongs.

In operation 330, the network system may allow the first receiver to feed back the transmission index to the first transmitter. Here, the network system may allow the first transmitter to transmit data according to a value of the transmission index. The network system may transmit data based on whether the first SINR of the first pair (e.g., the transmitter/receiver pair i) of the first transmitter and the first receiver exceeds the first transmission threshold $\xi_i$. For example, when the first SINR of the transmitter/receiver pair i exceeds the first transmission threshold $\xi_i$, the network system may allow the transmitter to transmit data.

In operation 340, the network system may calculate a second transmission threshold locally for each of the distributed networks, based on whether at least one transmitter that transmits data according to the transmission index fed back in operation 330 is present in the heterogeneous distributed wireless network system. For example, when there is no transmitter that transmits data according to the transmission index in the heterogeneous distributed wireless network system, the network system may calculate the second transmission threshold. More specifically, the network system may calculate a secrecy capacity (e.g., $R\mathcal{N}_{,i}(\xi_i)$ in Equation 6) for the first pair, based on the first SINR (e.g., $\gamma\mathcal{N}_{,i}$ in Equation 4) of the first pair for transmitting data among all the transmitter/receiver pairs included in the heterogeneous distributed wireless network system, and based on an SINR (e.g., $\gamma\mathcal{N}_{,\bar{j}}$ in Equation 5) of a receiver belonging to one of pairs other than the first pair among all the transmitter/receiver pairs.

The network system may calculate the second transmission threshold that maximizes the secrecy capacity. For example, the network system may calculate a probability $\delta_i(\xi_i)$ that the first transmitter transmits data for each of the distributed networks in the heterogeneous distributed wireless network system, as in Equation 8.

For example, the network system may calculate a local transmission probability $\delta_i^{(l_i)}(\xi_i^{(l_i)})$ that data is transmitted in a distributed network including the first pair to which the first transmitter belongs, based on the probability that the first transmitter transmits data, as in Equation 10. In this example, the network system may calculate the local transmission probability $\delta_i^{(l_i)}(\xi_i^{(l_i)})$ as in Equation 10 by approximating a path loss in the distributed networks as in Equation 9, based on a large path loss in different distributed networks.

The network system may calculate a new transmission threshold (e.g., a second transmission threshold) based on the local transmission probability $\delta_i^{(l_i)}(\xi_i^{(l_i)})$. The network system may calculate a second transmission threshold $\xi_i^{(l_i)}$ to maximize the local transmission probability.

In operation 350, the network system may selectively determine whether data is transmitted for each of the distributed networks, based on the SINR of the first pair to which at least one transmitter that transmits data belongs, a second SINR that is based on SNRs of receivers belonging to pairs other than the first pair, and the second transmission threshold $\xi_i^{(l_i)}$ calculated in operation 340.

In operation 360, the network system may transmit data based on whether data is transmitted, determined in operation 350.

Figure 4:
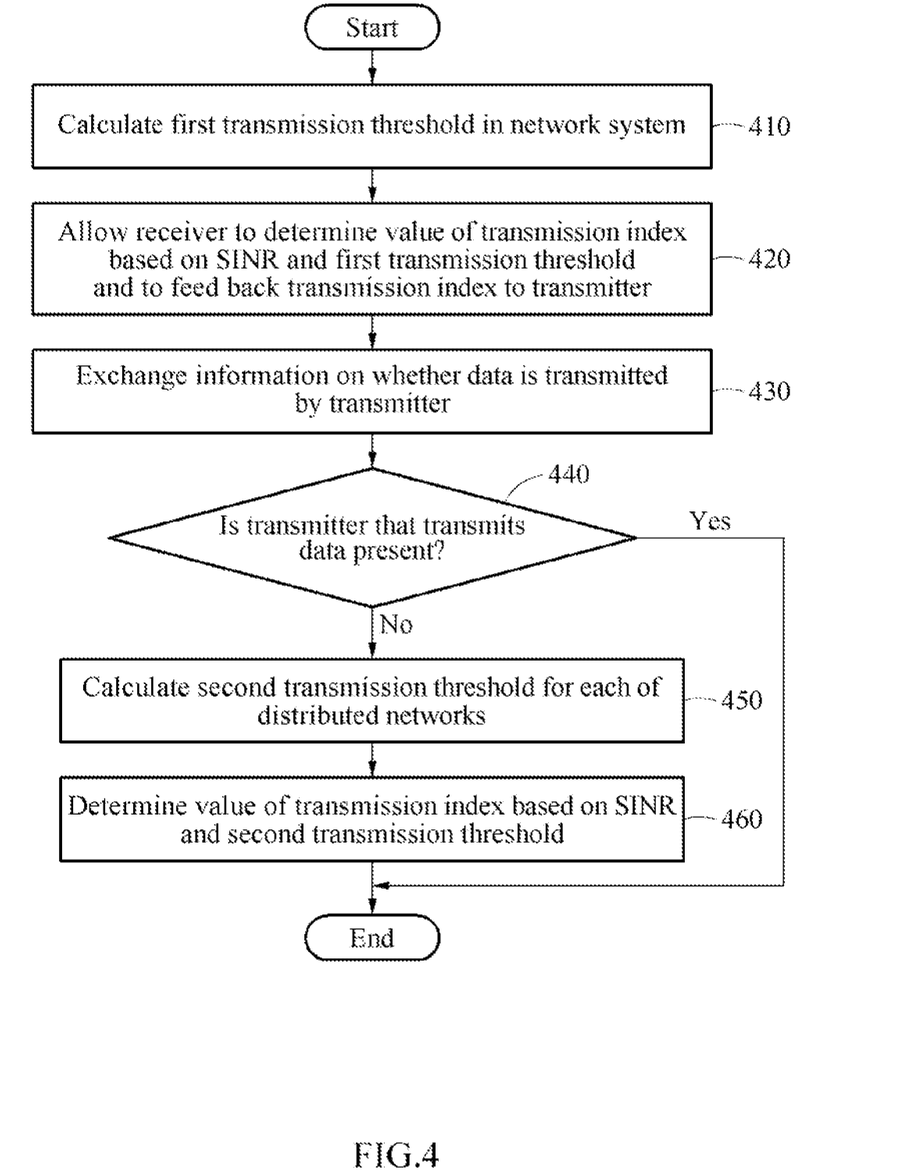
FIG. 4 is a flowchart illustrating another example of a communication method according to an example embodiment.

FIG. 4 is a flowchart illustrating another example of a communication method according to an example embodiment. In the following example embodiments, operations may be performed sequentially, but not necessarily performed sequentially. For example, the operations may be performed in different orders, and at least two of the operations may be performed in parallel.

Referring to FIG. 4, a process in which a network system according to an example embodiment determines a value of a transmission index through operations 410 through 460 is illustrated.

In operation 410, the network system may calculate a first transmission threshold in a heterogeneous distributed wireless network including a plurality of distributed networks. In operation 420, the network system may allow a receiver to determine a value of a transmission index based on an SINR and the first transmission threshold and to feed back the transmission index to a transmitter.

In operation 430, the network system may exchange information on whether data is transmitted by the transmitter in the heterogeneous distributed wireless network.

In operation 440, the network system may determine whether a transmitter that transmits data is present in the heterogeneous distributed wireless network. In an example, when it is determined that even one transmitter transmits data in operation 440, the network system may end an operation.

In another example, when it is determined that there is no transmitter that transmits data in operation 440, the network system may calculate a new second transmission threshold for each of the distributed networks included in the heterogeneous distributed wireless network in operation 450.

In operation 460, the network system may determine a new value of the transmission index based on an SINR (e.g., a second SINR) and the second transmission threshold calculated in operation 450. For example, the network system may allow a transmitter with a high SINR to transmit data in a corresponding distributed network, based on the new value of the transmission index determined in operation 460.

Figure 5:
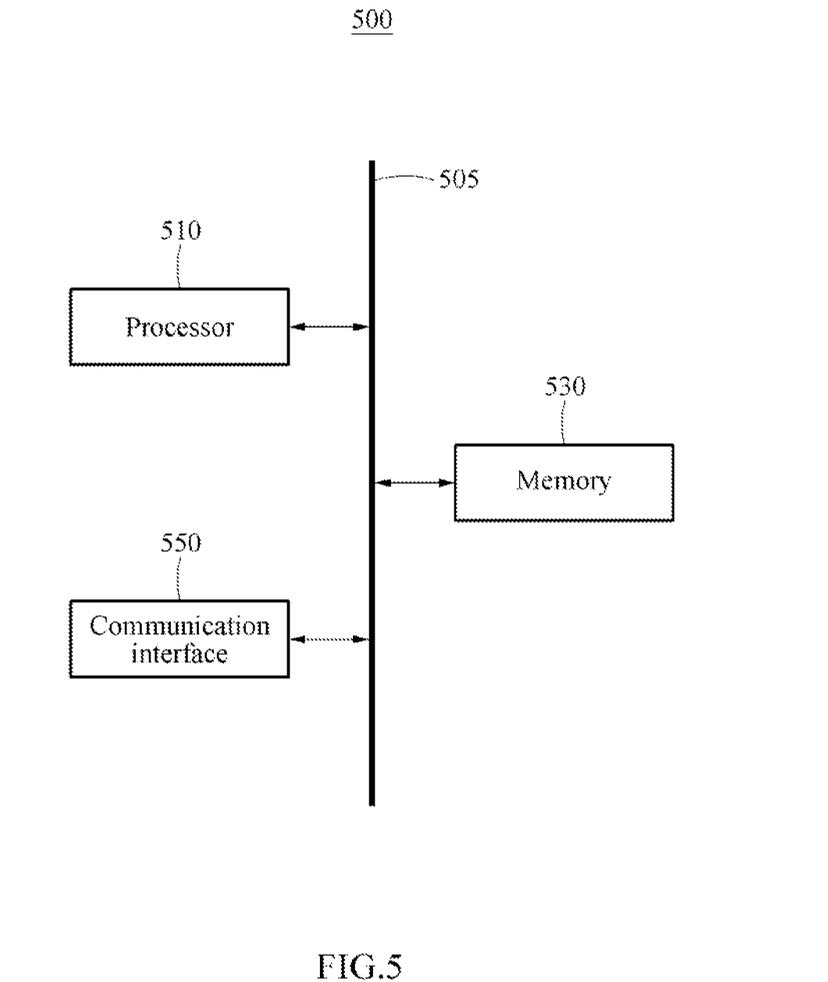
FIG. 5 is a block diagram of a heterogeneous distributed wireless network system according to an example embodiment.

FIG. 5 is a block diagram of a heterogeneous distributed wireless network system according to an example embodiment. Referring to FIG. 5, a heterogeneous distributed wireless network system 500 according to an example embodiment may include a processor 510, a memory 530, and a communication interface 550.

The processor 510 may calculate a first transmission threshold in the heterogeneous distributed wireless network system 500 including a plurality of distributed networks that share the same frequency band. The processor 510 may determine whether data is transmitted by transmitter/receiver pairs included in the heterogeneous distributed wireless network system 500, based on the first transmission threshold. The processor 510 may calculate a second transmission threshold locally for each of the distributed networks based on whether data is transmitted by at least one transmitter belonging to the transmitter/receiver pairs. The processor 510 may selectively determine whether data is transmitted for each of the distributed networks based on the second transmission threshold.

In addition, the processor 510 may perform at least one of the methods described with reference to FIGS. 1 through 4 or a scheme corresponding to the at least one method. The processor 510 may be a hardware-implemented network system having a circuit that is physically structured to execute desired operations. For example, the desired operations may include codes or instructions included in a program. The hardware-implemented network system 500 may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The memory 530 may store a variety of information generated in a processing process of the processor 510 described above. In addition, the memory 530 may store a variety of data and programs. The memory 530 may include, for example, a volatile memory or a non-volatile memory. The memory 530 may include a high-capacity storage medium such as a hard disk to store a variety of data.

The communication interface 550 may transmit data for each of the distributed networks, based on whether data is transmitted, determined by the processor 510.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A communication method of a heterogeneous distributed wireless network system, the communication method comprising:
    calculating a first transmission threshold in the heterogeneous distributed wireless network system comprising a plurality of distributed networks that share a same frequency band;
    determining whether data is transmitted by transmitter/receiver pairs included in the heterogeneous distributed wireless network system, based on the first transmission threshold;
    calculating a second transmission threshold locally for each of the distributed networks, based on whether data is transmitted by at least one transmitter belonging to the transmitter/receiver pairs; and
    selectively determining whether data is transmitted for each of the distributed networks based on the second transmission threshold, and transmitting the data.

2. The communication method of claim 1, wherein the determining of whether the data is transmitted by the transmitter/receiver pairs comprises:
    determining a transmission index indicating whether data is transmitted by a first transmitter paired with a first receiver based on the first transmission threshold and a first signal-to-interference noise ratio (SINR) of the first receiver belonging to the transmitter/receiver pairs; and
    allowing the first receiver to feed back the transmission index to the first transmitter.

3. The communication method of claim 2, wherein the determining of the transmission index comprises:
    calculating the first SINR of the first receiver; and
    determining the transmission index indicating whether the data is transmitted by the first transmitter paired with the first receiver, based on the first SINR.

4. The communication method of claim 3, wherein the determining of the transmission index comprises determining the transmission index based on a signal-to-noise ratio (SNR) corresponding to the first transmitter, a channel between the first transmitter and the first receiver forming a first pair, and a channel between a second transmitter and the first receiver in a distributed network to which the first pair belongs.

5. The communication method of claim 2, further comprising:
    allowing the first transmitter to transmit the data according to the transmission index, based on whether the first SINR of the first receiver forming a first pair with the first transmitter exceeds the first transmission threshold.

6. The communication method of claim 2, wherein the calculating of the second transmission threshold comprises calculating the second transmission threshold locally for each of the distributed networks, based on whether the at least one transmitter that transmits data based on the transmission index is present in the heterogeneous distributed wireless network system.

7. The communication method of claim 6, wherein the calculating of the second transmission threshold comprises, when the at least one transmitter is absent in the heterogeneous distributed wireless network system, calculating the second transmission threshold.

8. The communication method of claim 1, wherein the calculating of the second transmission threshold comprises:
    calculating a secrecy capacity for a first pair that transmits the data among the transmitter/receiver pairs included in the heterogeneous distributed wireless network system, based on an SINR of the first pair and an SINR of a receiver belonging to one of pairs other than the first pair; and
    calculating the second transmission threshold based on the secrecy capacity.

9. The communication method of claim 8, wherein the calculating of the second transmission threshold comprises:
    calculating a probability that a transmitter transmits data for each of the distributed networks in the heterogeneous distributed wireless network system;
    calculating a local transmission probability that the data is transmitted in a distributed network including a transmitter/receiver pair to which the transmitter belongs, based on the probability that the transmitter transmits data; and
    calculating the second transmission threshold based on the local transmission probability.

10. The communication method of claim 9, wherein the calculating of the local transmission probability comprises calculating the local transmission probability by approximating a path loss in the distributed network.

11. The communication method of claim 1, wherein the selectively determining of whether the data is transmitted for each of the distributed networks comprises:
    selectively determining whether data is transmitted for each of the distributed networks, based on an SINR of a first pair to which at least one transmitter that transmits the data belongs, a second SINR that is based on SINRs of receivers belonging to pairs other than the first pair, and the second transmission threshold; and
    transmitting the data based on a result of the determining of whether the data is transmitted.

12. The communication method of claim 1, wherein the calculating of the first transmission threshold comprises calculating the first transmission threshold based on a path loss of the transmitter/receiver pairs included in the heterogeneous distributed wireless network system.

13. A non-transitory computer-readable storage medium storing instructions that, when executed by a processor, cause the processor to perform the communication method of claim 1.

14. A heterogeneous distributed wireless network system comprising:
   a processor configured to calculate a first transmission threshold in the heterogeneous distributed wireless network system comprising a plurality of distributed networks that share a same frequency band, to determine whether data is transmitted by transmitter/receiver pairs included in the heterogeneous distributed wireless network system based on the first transmission threshold, to calculate a second transmission threshold locally for each of the distributed networks based on whether data is transmitted by at least one transmitter belonging to the transmitter/receiver pairs, and to selectively determine whether data is transmitted for each of the distributed networks based on the second transmission threshold; and
   a communication interface configured to transmit the data for each of the distributed networks based on a determination of whether the data is transmitted.

15. The heterogeneous distributed wireless network system of claim 14, wherein the processor is configured to:
   determine a transmission index indicating whether data is transmitted by a first transmitter paired with a first receiver among the transmitter/receiver pairs, based on the first transmission threshold and a first signal-to-interference noise ratio (SINR) of the first receiver; and
   allow the first receiver to feed back the transmission index to the first transmitter.

16. The heterogeneous distributed wireless network system of claim 15, wherein the processor is configured to:
   calculate the first SINR of the first receiver; and
   determine the transmission index indicating whether the data is transmitted by the first transmitter paired with the first receiver, based on the first SINR.

17. The heterogeneous distributed wireless network system of claim 15, wherein the processor is configured to allow the first transmitter to transmit the data according to the transmission index, based on whether the first SINR exceeds the first transmission threshold.

18. The heterogeneous distributed wireless network system of claim 15, wherein the processor is configured to calculate the second transmission threshold locally for each of the distributed networks, based on whether the at least one transmitter that transmits data based on the transmission index is present in the heterogeneous distributed wireless network system.

19. The heterogeneous distributed wireless network system of claim 15, wherein the processor is configured to:
   calculate a secrecy capacity for a first pair that transmits the data among the transmitter/receiver pairs included in the heterogeneous distributed wireless network system, based on an SINR of the first pair and an SINR of a receiver belonging to one of pairs other than the first pair; and
   calculate the second transmission threshold based on the secrecy capacity.

20. The heterogeneous distributed wireless network system of claim 19, wherein the processor is configured to:
   calculate a probability that a transmitter transmits data for each of the distributed networks in the heterogeneous distributed wireless network system;
   calculate a local transmission probability that the data is transmitted in a distributed network including a transmitter/receiver pair to which the transmitter belongs, based on the probability that the transmitter transmits data; and
   calculate the second transmission threshold based on the local transmission probability.

* * * * *